United States Patent Office 2,794,550
Patented June 4, 1957

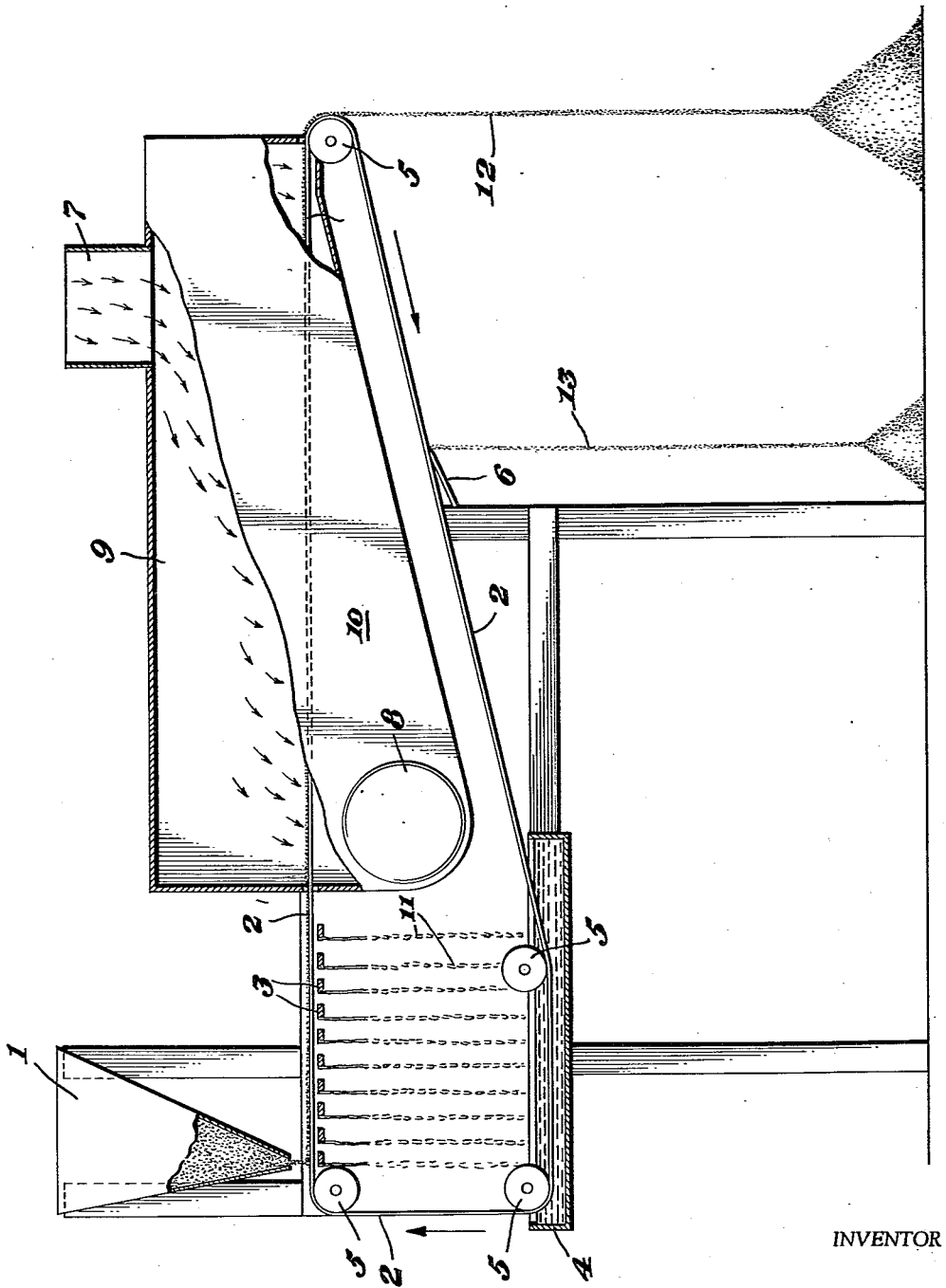

2,794,550

PROCESS OF SEPARATING PLANTAIN (BUCK-HORN) SEED FROM SMALL CROP SEEDS SUCH AS CLOVER, ALFALFA AND ANY OTHERS OF SIMILAR SIZE AND SPECIFIC GRAVITY

Stanley L. Warner, Howell, Mich.

Application November 1, 1950, Serial No. 193,324

2 Claims. (Cl. 209—46)

The present invention relates to improvements in the process of separating weed seed from crop seed by utilizing mucilaginous properties of weed seed when wetted, the process being an improvement over those disclosed in United States Patent Nos. 782,204 and 826,191.

In carrying out the present invention, the mixed seed is dropped upon a previously wetted conveyor of sheer, non-absorbent material and thereafter effecting a partial drying of the seed and conveyor by capillary action. Subsequently, the seed and conveyor is fully dried by drawing preheated air downwardly around the seed and through the conveyor.

An object of the invention is to provide an improved process of the type described in which a more accurate and complete separation is effected with less loss of crop seeds.

Another object is to provide an improved process of handling mixed weed and crop seeds which is capable of handling mixtures highly contaminated with weed seed yet with a minimum of loss of crop seeds.

In the drawings, a machine is shown in side elevation for carrying out my improved process, the machine being diagrammatic for convenience in illustration.

Referring to the drawings, mixed seeds are fed from the hopper 1 in a continuous stream upon the continuously moving endless conveyor 2 running over the rollers 5. The conveyor 2 is sheer and non-absorbent and may be fabricated from nylon threads woven with a marquisette weave. Such a weave provides air space between the threads of nylon to permit the air to pass in sufficient volume to quickly dry the conveyor and seeds. Likewise, the interstices between the threads will permit the removal of moisture from the conveyor and from the seeds by capillary action as hereinafter described.

To effect a partial drying of the conveyor 2 as well as the seeds by capillary action, cloth or blotter covered bars 3 having depending portions are located beneath the conveyor 2 and engage with the underside thereof. To moisten the conveyor 2 a water bath 4 is provided into which water 11 drips from the depending ends of the material covering the bars 3 for removing moisture from the conveyor 2 and the seeds by capillary action.

An air heating chamber 9, preferably containing electrical heating units, is employed to heat air drawn in the air inlet 7 and downwardly through the conveyor 2 by the exhaust chamber 10 located beneath the conveyor 2 and equipped with an air outlet 8 extending to an exhaust fan (not shown).

As the dried mixed seeds leave the end of the conveyor 2, the good crop seed which does not adhere to the conveyor 2 will be discharged as at 12 and the weed seed which adhere to the conveyor 2 because of its mucilaginous character when wetted will be removed as at 13 by the scraper 6.

Having thus described my invention what I claims as new novel process of separating weed seed from crop seed is:

1. The process of separating mucilaginous weed seeds from crop seeds comprising the steps of immersing and fully wetting a sheer, non-absorbent conveyor in a water bath, dropping a mixture of weed and crop seeds upon said conveyor, absorbing a portion of the moisture from said conveyor and seeds by capillary attraction, thereafter fully drying said conveyor and seeds by drawing pre-heated air downward around the seeds and through the conveyor, separating the crop seeds from the weed seeds by dropping the crop seeds from the conveyor, and then scraping off the weed seeds before the conveyor again enters the water bath.

2. The process of separating mucilaginous weed seeds from crop seeds comprising the steps of immersing and fully wetting a sheer, non-absorbent conveyor in a water bath, dropping a mixture of weed and crop seeds upon said conveyor, passing the conveyor over an absorbent member to partially dry said conveyor and seeds, thereafter fully drying said conveyor and seeds by drawing preheated air downward around the seeds and through the conveyor, separating the crop seeds from the weed seeds by dropping the crop seeds from the conveyor, and then scraping off the weed seeds before the conveyor again enters the water bath.

References Cited in the file of this patent

UNITED STATES PATENTS

| 782,204 | Prine | Feb. 7, 1905 |
| 818,118 | Prine | Apr. 17, 1906 |
| 826,191 | Potter | July 17, 1906 |
| 1,397,141 | Nourse | Nov. 15, 1921 |
| 1,748,224 | Hinde | Feb. 25, 1930 |
| 2,059,066 | Van Wyk | Oct. 27, 1936 |
| 2,608,297 | Jones et al. | Aug. 26, 1952 |